No. 892,553. PATENTED JULY 7, 1908.
L. E. ROBY & C. A. PATTISON.
DISTRIBUTING FAN.
APPLICATION FILED OCT. 7, 1907.
2 SHEETS—SHEET 1.
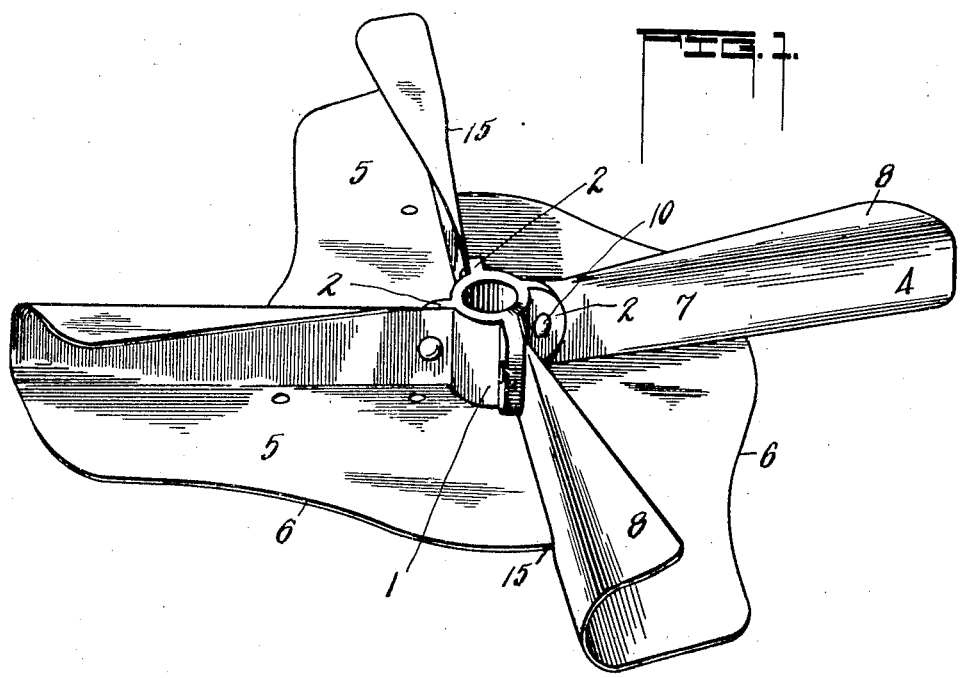
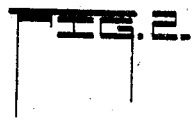
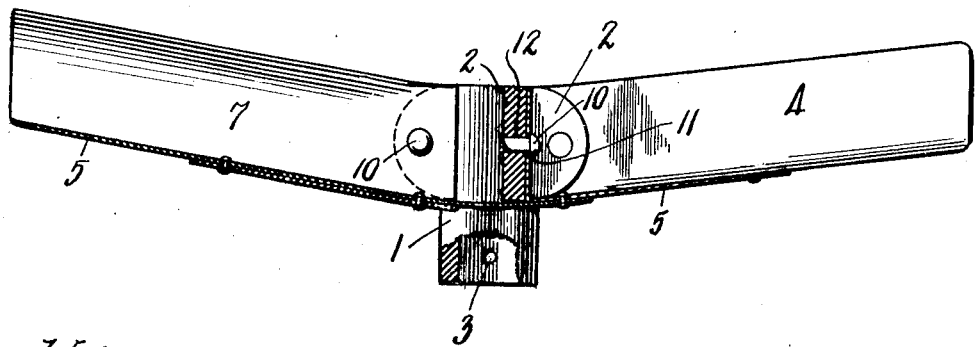

No. 892,553. PATENTED JULY 7, 1908.
L. E. ROBY & C. A. PATTISON.
DISTRIBUTING FAN.
APPLICATION FILED OCT. 7, 1907.
2 SHEETS—SHEET 2.
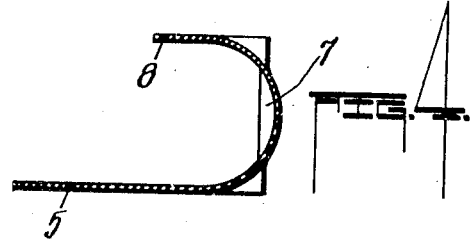
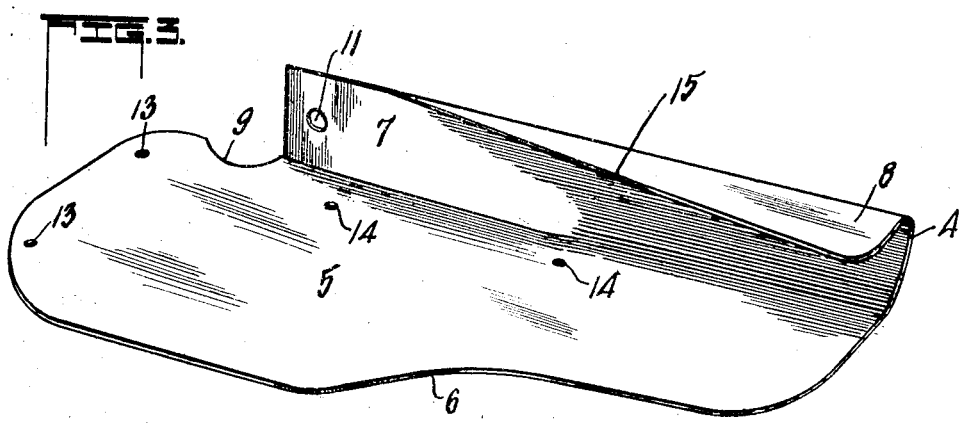
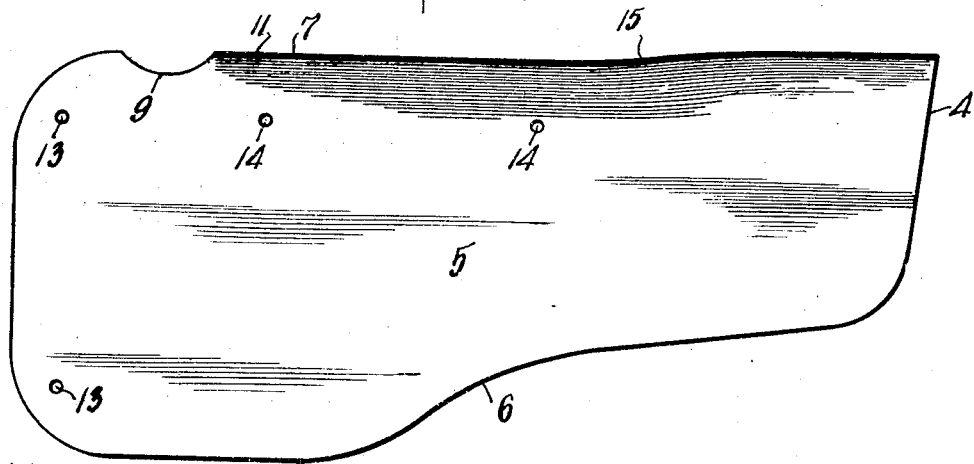
Witnesses:
Miles R. Fuller
Laura E. Claypool
Inventors:
Luther E. Roby
Clarence A. Pattison
By Chas. N. LaPost, Atty.

UNITED STATES PATENT OFFICE.

LUTHER E. ROBY AND CLARENCE A. PATTISON, OF PEORIA, ILLINOIS.

DISTRIBUTING-FAN.

No. 892,553.      Specification of Letters Patent.      Patented July 7, 1908.

Application filed October 7, 1907. Serial No. 396,233.

*To all whom it may concern:*

Be it known that we, LUTHER E. ROBY and CLARENCE A. PATTISON, citizens of the United States, residing at Peoria, in the county of Peoria and State of Illinois, have invented certain new and useful Improvements in Distributing-Fans; and we do hereby declare that the following is a full, clear, and exact description of the invention, which will enable others skilled in the art to which it appertains to make and use the same.

This invention has reference to certain new and useful improvements in broadcast seed distributers, commonly known as distributing fans, employed more particularly on seeding machines for distributing broadcast grain or other material over a field.

One of the objects which we have in view, is the construction of a light and inexpensive fan, the blades of which are suitably stamped or pressed into form from a single piece of sheet metal, and attaching the same to ears or wings projecting from a hub, preferably of cast metal.

That the invention may be more fully understood, reference is had to the following description and the drawings forming a part thereof, in which:—

Figure 1 is a perspective view on a somewhat reduced scale, of our improved distributing fan; Fig. 2 is an elevation, partially in section, of the fan shown in Fig. 1; Fig. 3 is a perspective view, of one of the blades of the fan; Fig. 4 is a cross section through the outer portion of the blade shown in Fig. 3, and Fig. 5 is a plan view of a blade, partially in section.

Like numerals indicate corresponding parts throughout the figures.

In the drawings, 1 denotes a tubular hub of suitable length from the upper half of which projects a plurality of wings or ears 2 which are preferably integral with the said hub, and in fact, in the construction of the fan, it is desirable that the hub be made of cast metal and capable of being attached to a shaft passing through the hub, which may be connected thereto, by passing a pin through perforations 3 in the lower portion of said hub and through a corresponding perforation in a shaft to which the same may be attached.

The blades of the fan are referred to generally as 4, and unlike the hub 1, are made from sheet metal, such as galvanized iron or other suitable material. The blades are duplicates of each other and it is intended in the manufacture of the same to stamp or press them by a single operation into the form shown in Fig. 1 or more particularly as seen in Fig. 3. By such operation, a blade is formed with a shelf portion 5 having an irregular contour as at 6, so as to be much wider at the receiving or inner portion thereof, and narrower at the outer or discharge end thereof. Each of said blades have the side wall 7 and the over-hanging shed portion 8; the former extends from the outer end of the blade to a point removed somewhat from the inner end thereof, and the shelf portion of the blade intermediate the inner end of said shelf portion, and the inner end of the wall 7 is provided with an approximately semi-circular cut-out portion 9, so that when the blade is adjusted to the hub, the semi-circular portion 9 will abut with and conform to the convex surface of the hub 1, and the inner edge of the wall 7 will coincide with the juncture of an ear 2 and the body of the hub to enable the inner end of the wall 7 to be secured to the ear, preferably by a rivet 10, which will pass through a perforation 11 in the wall 7 of the blade and a corresponding perforation 12 in the ear 2.

Each blade being secured to the hub in the manner just stated, the blades will over-lap each other as shown in Fig. 1, so that the inner end of the shelf portion of the blade which is provided with perforations 13 as shown in Fig. 3, may have rivets passed therethrough and through corresponding perforations, which I have indicated as 14, and which, it is understood, are provided in the shelf portions of each of said blades. In this way, a blade is connected to adjacent blades, one which crosses the inner end of the shelf portion and the other which has the inner end of the shelf portion lying beneath the central portion of said blade so that each of the blades are connected to one blade through perforations 13 and to another blade through the perforations 14.

The shed portion 8, been referred to, overlies considerable of the outer end of the shelf portion 5 of the blade and the longitudinal edge thereof, is carried obliquely inward and merges into the upper edge of the wall 7 at a point sufficiently removed from the inner end of the wall 7, so as not to interfere with the connection of the wall with an ear of the hub, but more particularly to not interfere with the discharge of grain or other material from above, down onto the inner or receiving portions of the shelves of the blades; and the walls of said blades have an irregular contour at a point, approximately as at 15; that is to say, the walls, as shown in Fig. 5, are bent outwardly and then forwardly, which gives to the outer end of said blades, a much wider sweep than at the inner ends thereof, and the grain or other material as it falls onto the shelf portions, will hug closely the bend formed in the blade where the shelf and wall portions unite and be protected from discharge therefrom in the provision of the shed, until said grain reaches the outer end of said blades. To insure a wide sweep of the grain or material as it leaves the fan, we prefer to incline the blades upwardly as shown in Fig. 2, and to round the outer ends of the walls of said blade, as best seen in Figs. 1 and 4.

It will be observed from an examination of Fig. 1, that from the manner in which we have constructed the inner ends of the blades where they join the hub, that they have the appearance of being a part of the hub, which obviates any cracks or open spaces between each of the receiving portions of the blades and between said blades and the hub, so that there is no possible chance for grain or other material which may be discharged onto the fan, passing through or between the blades or the blades and the hub, and that its discharge from said blades is occasioned by the rotating movement thereof, which will cause the grain or material to pass along the shelf portions of the fans and beneath the sheds of the blades until it reaches the outer ends of said blades from which it is distributed broadcast.

We are aware that distributing fans have been made entirely of cast metal, having blades with over-hanging shed portions and which have been peculiarly shaped to insure a broadcast distribution of material therefrom, and wherein the blades and hub portions have been cast integral. We are also aware that others have attempted to construct a fan entirely of sheet metal, but for one reason and another, they have not proved a success.

One of the greatest troubles that an operator has in the use of broadcast distributing machines, is that fans which are made entirely of cast metal, will break in the accidental engagements of the blades with obstructions, which puts the machine out of commission and manufacturers have experienced great difficulty in shipping their machines and insuring that the fans will reach their destinations without becoming broken. This breakage of fans is not only an inconvenience but has proven an expensive proposition in the manufacture of broadcast distributing machines.

We have in devising the fan illustrated in the drawings, not only overcome the objection of breakage of the blades of the fan in shipping and in use, should the fan engage with any obstruction, but we have devised a fan which is light in construction and inexpensive to manufacture, the blades being stamped or pressed from a single piece of sheet metal and very quickly and easily assembled or connected to the hubs with which they may be attached.

Having thus fully described our invention, what we claim and desire to secure by Letters Patent of the United States, is:—

1. A distributing fan, comprising a hub provided with a plurality of ears, a plurality of blades, each of said blades having a wall portion, and means for securing the inner end of the walls of said blades to the ears of the hub.

2. A distributing fan, comprising a cast hub provided with a plurality of ears integral therewith, a plurality of sheet metal blades which over-lap and are riveted to each other, and also riveted to the ears of said hub.

3. A distributing fan, comprising a hub provided with a plurality of ears, a plurality of blades, each bent into form from a single piece of sheet metal and provided with shelf portions, side walls and over-hanging sheds, said side walls having an irregular contour and the longitudinal edge of the sheds carried obliquely inwardly joined with the upper edge of said side walls near their inner ends, and means for connecting the inner ends of the side walls to the ears of the hub.

4. A blade for a distributing fan, bent into form from a single piece of sheet metal and having a shelf portion wider at its receiving than at its discharge end, a side wall bent approximately at right angles to the shelf portion thereof, its outer end concave and merging into an over-hanging shed portion with one edge extending obliquely inwardly and merging into the upper edge of the inner end of the said side wall, and the edge of the shelf portion intermediate the inner ends of said shelf portion and the side wall provided with an approximately semi-circular cut-out portion.

5. A distributing fan, comprising a tubular hub, the upper portion of which is provided with a plurality of laterally projecting ears, a plurality of blades, each of said blades having side walls, means for securing the inner ends of said walls to the blades, and the inner edges of the inner ends of said blades shaped to abut with and conform to the convex surface of said hub.

6. A distributing fan, comprising a hub provided with a plurality of ears, a plurality of blades, each of said blades having side walls and the shelf portions thereof riveted to adjacent blades on opposite sides, means for securing the inner ends of the side walls to the ears of the hub, and the inner edges of the shelf portions of the blades having an approximately semi-circular cut-out portion to conform to the convex surface of said hub.

7. A distributing fan, comprising a hub provided with a plurality of laterally projecting ears, a plurality of blades, each of said blades having a shelf portion, the inner ends of which lie beneath adjacent blades and secured thereto, and having their inner edges conforming to the convex surface of said hub, said blades also provided with side walls, and means for connecting the inner ends of said side walls to the ears of the hub.

8. A distributing fan constructed of a plurality of blades, each provided with a shelf portion and with a side wall, means for securing one side of each shelf portion to the end of a shelf portion of an adjacent blade, a hub, and means for securing the inner ends of the walls of the blades to said hub.

In testimony whereof we affix our signatures, in presence of two witnesses.

LUTHER E. ROBY.
CLARENCE A. PATTISON.

Witnesses:
   CHAS. W. LA PORTE,
   ROBT. N. MCCORMICK.